United States Patent Office 2,951,798
Patented Sept. 6, 1960

2,951,798

PHOTOXIDATION PROCESSES UTILIZING AROMATIC PORPHYRIN CATALYSTS

Dexter B. Sharp, Vandalia, Ohio, assignor to Monsanto Chemical Company, St. Louis, Mo., a corporation of Delaware No Drawing. Filed Nov. 13, 1957, Ser. No. 696,061

7 Claims. (Cl. 204—162)

The present invention is directed to photoxidation processes utilizing 1,2,3,4,5,6,7,8-octaphenyl porphyrins and azaporphyrins as photoxidation catalysts. The octaphenyl photoxidation catalyst compounds can be represented by the formula:

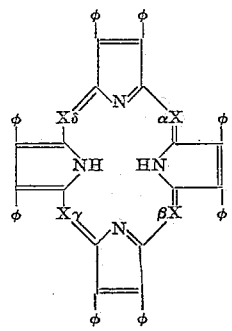

in which each X is selected from the group consisting of nitrogen, CH, and C-alkyl. The phenyl groups can be such phenyl groups as, for example, phenyl, chlorophenyl, dichlorophenyl, methylphenyl, N,N-dimethylaminophenyl, hydroxyphenyl, naphthyl, etc., or phenyl groups containing any or a combination of such substituents as alkyl groups, for example, methyl, ethyl, propyl, isopropyl, butyl, isobutyl, secondary butyl, tertiary butyl, n-amyl, isoamyl, tertiary amyl, n-hexyl, decyl, dodecyl, etc.; alkoxy substituents, for example, methoxy, ethoxy, isopropoxy, butoxy, hexyloxy, etc.; halogen substituents, for example, bromine, chlorine, fluorine, and iodine; and any other substituents which do not change the fundamental aromatic character of the groups.

The α, β, γ, and δ positions in the above formula can also be designated as the meso positions.

The porphyrins, of course, are the class of compounds in which four pyrrole nuclei are linked together in a circular pattern by four carbon atoms so that a great ring containing 16 atoms is formed. While the formulae herein depict the unsaturated porphyrin ring system in conventional manner, it will be recognized that the double-bonds are capable of shifting to various resonance states and that photosensitizing use of the catalyst described herein is contemplated by the present invention, regardless of what the actual predominant resonance state may be. The use of the octaphenylazaporphyrin catalysts, i.e., octaphenyl porphyrins with meso-carbon replaced by nitrogen, is also within the contemplation of the present invention, regardless of what the actual resonance state may be.

It will be understood that the use of the metal chelate forms of the above structure is also included in the present invention. Such metals as, for example, zinc, magnesium, copper, iron, nickel, cobalt, lead, etc. can readily be chelated with porphyrins, and the resulting chelates are effective as photosensitizers. The chelates can be represented by the above porphyrin structure, with the following bonding between the metal and the pyrrole nitrogens.

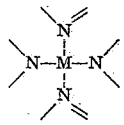

Various other metals also form chelates of the described porphyrins which are effective as catalysts, for example, alkali and alkaline earth metals such as sodium, potassium, calcium, etc. It will be understood that when porphyrins are described or claimed herein, generically or specifically, by structural formula or otherwise, the metal chelate forms as well as the free bases are contemplated.

It is an object of the present invention to improve the efficiency and yields in photoxidation reactions by the use of superior photosensitizing catalysts. It is a further object to render photoxidation procedures more practical and economical by the use of photosensitizers of improved stability. It is a further object to employ photosensitizers having good solubility in organic substrates. It is a further object to utilize superior photosensitizers which can be prepared by procedures of organic synthesis.

The terms "photoxidizing," "photoxidation," "photosensitized," etc. as used herein in the specification and claims are intended to cover true photosensitized oxidation reactions in which light in the presence of a photosensitizing catalyst causes the oxidation; the terms are not intended to include autoxidations, or oxidations proceeding by a free radical mechanism in which irradiation with light serves to initiate free radicals. The true photosensitized oxidation reactions are characterized by the fact that the rate of the reaction is proportional to the intensity of irradiation at both high and low intensities, and the fact that ordinary oxidation inhibitors do not retard the reaction.

The photoxidation reaction of the present invention can be postulated according to the following equations:

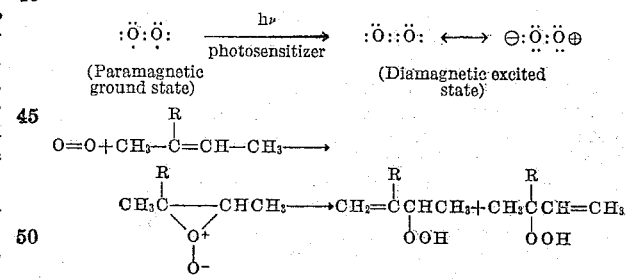

In these reactions a photosensitizer must be present to catalyze the conversion of the molecular oxygen in the ground state to an activated polarizable state. Light is also necessary to effect this reaction. The irradiating light can vary considerably in wave length, wave lengths in the visible regions being preferred. The light can be monochromatic or polychromatic. Light of wave lengths in the range of about 3600 to about 8000 angstroms has been found very suitable. While light in the ultraviolet region, particularly the near ultraviolet region, can be used as it is effective to some extent in causing photoxidation, it is desirable to avoid use of light in these regions as it tends to catalyze auto-oxidations and other free-radical type reactions. High energy ultraviolet may also cause accelerated catalyst photo-decomposition. The speed of the photoxidation reaction is proportional to the intensity of the irradiation; this relationship is very important, as it makes it possible to obtain reaction rates suitable for commercial production by merely providing high power light sources.

The amount of octaphenyl porphyrin or azaporphyrin photosensitizer can vary widely, but ordinarily only small "catalytic" amounts will be used. For example, amounts of 0.005% by weight based on the weight of substrate are satisfactory. Various other amounts, for example, from about 0.0001% up to about 1% or more by weight of substrate such as propylene trimer or other olefin can be used. The photoxidation will generally be conducted in the absence of solvent. However, various organic solvents can be used for the reaction, and even water may be present during the reaction. The use of solvent will be advantageous in some cases to aid the mutual intersolubility of substrate and particular octaphenyl porphyrin or azaporphyrin photosensitizers. Examples of a few suitable solvents are aromatic hydrocarbons, said as benzene, toluene, etc.; acyclic and cyclic alkanes, for example, n-hexane and cyclohexane; amines, for example, pyridine, etc. Temperature does not have a strong influence on the photoxidation reaction. However, it is desirable to keep the substrate in the liquid or solution state, usually by temperatures below the boiling point at atmospheric pressure. Temperatures of the order of room temperature, for example, 20 to 30° C. will generally be used. Other temperatures, for example, from below 0° to 100° C. or higher can be used; if desired the reaction can be conducted at superatmospheric pressures to maintain the liquid state at higher temperatures.

The rate of oxygen addition during the photoxidation can vary greatly, although it may affect the time required to complete the reaction. Generally, the addition rate will be at least sufficient to provide all the oxygen which can be absorbed and utilized at a given time. Various types of agitators, mixers, and gas-liquid contact apparatus and procedures can be utilized to promote rapid absorption of oxygen by the substrate, thereby insuring a sufficiently high effective oxygen concentration; the concentration of oxygen can also be increased by use of pressure. Oxygen gas can be utilized as such, or it can be admixed with nitrogen or other gases. Air is an oxygen-containing gas which is very suitable for use in the photoxidation of substrate; it will be understood that the term "oxygen" as used in the present specification and claims includes molecular oxygen in air or in admixture with other gases, or dissolved in or admixed with liquids, or generated in situ, as well as oxygen per se.

The photoxidation process of the present invention can be applied to any photoxidizable substrates; the inventive feature of the process is essentially the discovery of the superior photosensitizing activity of the catalyst described herein, and this photosensitizing activity is valuable in the photoxidation of any substrates. Representative substrates are, for example, such open chain (aliphatic) and cyclic monoolefins as 1-heptene, 1-octene, 1-dodecene, 1-hexadecene, diisobutylene, cyclopentene, 1-methyl-1-cyclopentene, cyclohexene, 1-methylcyclohexene, 1,2-dimethylcyclohexene, cyclooctene, α-pinene, dipentene, limonene, carvomenthene, terpinolene, propylene trimers, tetramers, pentamers, etc., all of which are photoxidized to hydroperoxides, presumably by means of an allylic shift as represented by:

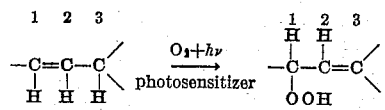

The hydroperoxide products can readily be reduced to alcohols, or used in other ways as organic intermediates for the production of useful compounds. The photoxidation process of the present invention converts cyclic conjugated dienes to endocyclic peroxides, and open chain conjugated dienes to exocyclic peroxides; representative of dienes which are so converted are, for example, cyclopentadiene, 1,3-cyclohexadiene, 2-methyl-1,3-cyclohexadiene, α-terpiene, α-phellandrene, α-pyronene, β-pyronene, 1,3-hexadiene, 1,3-dimethylbutadiene, 2,3-dimethylbutadiene, alloocimene, etc. Other substrates which can be photoxidized in the process of the present invention are, for example, amines; thioureas, e.g., thiourea; dienes of the sterol series, e.g., ergosterol; heterocyclic olefins, e.g., furans; triolefins; olefinic acids, e.g., oleic acid; fulvenes, e.g., phenylfulvene; aldehydes; phenylhydrazones; semicarbazones, thiosemicarbazones, enol ethers, sulfinic acids, etc.; such groups as ester, amide, urethane, n-acetyl, phenyl, hydroxyl, Cl, Br, etc.; even if adjacent to the oxidizable group in the foregoing types of substrates, do not ordinarily interfere in the photoxidation reaction. It will be appreciated, of course, that the foregoing substrates will vary in their case of photoxidation, photoxidation rates, etc., and in the products resulting from photoxidation; such variations, however, do not affect the photosensitizing activity of the octaphenyl porphyrin catalysts in the photoxidation reactions. It is evident from the foregoing, however, that the present process concerns introducing oxygen into the molecule of the organic compound without destruction thereof, i.e., actual addition of the oxygen to the compound, as a result of subjecting the organic compound capable of adding oxygen under the influence of light and a photosensitizing catalyst to simultaneous light irradiation and contact with oxygen and an octaphenyl porphyrin.

The propyline polymers referred to above are unsaturated olefins obtained by polymerization of propylene. In particular, propylene trimer used as the substrate, in several examples below, was obtained by acid-catalyzed homoaddition of propylene to itself. The general method involves passage of propylene at superatmospheric pressure over a phosphoric acid-impregnated solid support at temperatures greater than 100° C., collecting the polymerized hydrocarbon and fractionating to isolate the trimer, tetramer, pentamer, etc., fractions. The trimer utilized herein was obtained from Enjay Company and has a boiling range of 260–290° F., and sp. gr. 20/20 of 0.736–0.740. A minimum of 100 p.p.m. t-butylcatechol is added as oxidation inhibitor. In early photoxidation runs, this was removed by adsorption, but the photoxidation proceeds equally as well in its presence or absence. The propylene pentamer used also was obtained from Enjay and has the following properties: Enjay "Pentadecene," sample No. 19–E–1, B.P. 249–268° C., API gravity at 60° F., 41.7. Propylene tetramer used was Enjay "Tetrapropylene" and has a B.P. 350–445° F., sp. gr. 20/20 of 0.768–0.781.

The following examples illustrate certain embodiments of the invention, but the invention is not to be considered as limited thereto.

*Example 1*

A conventional 20 unit Precision Scientific Warburg apparatus was provided with a double-circle, 5000-volt, "standard cool white" fluorescent light especially fabricated to fit the apparatus. The light was immersed in the constant-temperature bath to provide uniform illumination of the Warburg vessels from below. Crude green magnesium octaphenylporphyrazine, 10 mg., was dissolved in 10 ml. pyridine and 0.2 ml. of the resulting solution was placed in a Warburg vessel along with 2.8 ml. of a 9:5 (by volume) mixture of pyridine and propylene trimer (free of inhibitors). The oxygen uptake at 25° C. under illumination was then measured, as recorded below:

| Time (minutes): | Oxygen absorbed in microliters |
|---|---|
| 15 | 93 |
| 30 | 189 |
| 45 | 292 |
| 60 | 395 |
| 75 (in the dark after 60) | 405 |

The high photosensitizing activity of the catalyst is indicated by the large amount of absorption under irradiation, compared to the negligible absorption in the dark.

Example 2

A 10.8-mg. amount of purple octaphenylporphyrazine was easily dissolved in 100 ml. propylene trimer. The oxygen absorption of a 3-ml. portion of the solution was then measured in the Warburg apparatus.

| Time (minutes): | Oxygen absorbed in microliters |
|---|---|
| 15 | 49 |
| 30 | 85 |
| 45 | 165 |
| 60 | 223 |
| 75 (in the dark after 60) | 223 |

Under comparable conditions, only 118 microliters of oxygen was absorbed in one hour in the presence of phthalocyanine.

The following examples illustrate procedures (Linstead et al. J. Chem. Soc., 1937, 929; 1940, 1079) which can be used in preparing the octaphenylporphyrins and azaporphyrins utilized as catalysts in the present photoxidation procedures. In general, octaphenylporphyrazines are prepared by self condensation of diphenylmaleinitriles, while octaphenylporphyrins are produced by condensation of α,α'-diphenylmaleimide with zinc acetate (Helberger and Rebay, Ann., 536, 181 (1938)). The intermediate octaphenyl mono-, di-, and triaza porphyrins can be prepared by reaction of suitable mixtures of the above. Similarly, the meso-alkyl octaphenylporphyrins and azaporphyrins can be obtained by condensation of α,α'-diphenylmaleimide, and zinc carboxylate salts alone, or along with the diphenylmaleinitriles. Various derivatives can be obtained by simply employing substituted diphenylmaleimides or substituted zinc carboxylate acid salts, along with diphenylmaleinitriles. Some examples of octaphenylporphyrins and azaporphyrinsporphyrazines, other than those in the examples above, which can be used as photosensitizing catalysts in the process of the present invention are the following, it being understood that in each case the phenyl groups are located at the 1, 2, 3, 4, 5, 6, 7, and 8 positions; octakis (2,3-dichlorophenyl)porphyrazine, octakis(4-hydroxyphenyl)-porphyrazine, octaphenylporphin, octaphenylazaporphin, octaphenyldiazaporphin, octaphenyltriazaporphin, octakis(3 - methylphenyl) - diazaporphin, tetrakis(2,4-dichlorophenyl)tetraphenylporphyrazine, octanaphthylporphyrazine, octaphenyl-α,β,γ,δ-tetramethylporphin, octaphenyl-ms-dibutyldiazaporphin, etc. While the following example illustrates one method of preparing octaphenylporphyrins and porphyrazines, it will be understood that the octaphenylporphyrins and azaporphyrins can be employed as photoxidation catalysts, regardless of their method of preparation.

Example 3

Diphenylmaleinitrile, 5 grams, was mixed with 1 gram of magnesium powder in a test tube and heated for about one-half hour in an oil bath at 260–290° C. (Linstead, J. Chem. Soc., 1937, 929). The reaction mixture was converted to a solid crystalline purple mass. The test tube was removed from the oil bath and permitted to cool, and the contents of the test tube were removed, ground to a powder, and added to a 25% solution of aqueous acetic acid. When reaction of the acid with the magnesium had ceased, the solution was filtered, and the solids were washed with water. A portion of the solids was air-dried for use as catalyst without further treatment. The solids were heated with 10% aqueous sodium hydroxide solution, filtered, washed with hot water, and dried. A 0.5 gram portion of the dried material was boiled for an hour in 140 ml. of constant boiling aqueous hydrochloric acid; the solids were filtered out and reheated in hydrochloric acid overnight. The solids were removed by filtration, dissolved in benzene, and added to an aluminum oxide column. A benzene-pyridine mixture containing about 20% pyridine was then added to the column to elute the octaphenylporphyrazine, giving a purple forerun followed by a green band. The green band material was then evaporated to give an oily green residue. A 3-gram portion of the octaphenylporphyrazine magnesium salt was dissolved in pyridine and chromatographed; the solvent was evaporated from the eluate under reduced pressure, and the residue was dissolved in about 300 ml. chloroform. The chloroform solution was stirred one hour with 100 ml. concentrated hydrochloric acid. The chloroform layer was separated, shaken with 60 ml. concentrated ammonium hydroxide, separated, washed with water, and chromatographed on an F–1 $Al_2O_3$ column. The first three eluates which were purple octaphenylporphyrazine were combined. Eluates No. 8, 9, and 10 which were green, were also combined.

Further discussion of the preparation of porphyrins appears in my copending application Serial Number 696,063, filed of even date herewith and any of the procedures taught therein are applicable in the present invention; in particular, the solvent-free preparation taught therein is very suitable for the preparation of octaphenylporphyrins. Moreover, the photoxidation processes of the present invention can be applied to the photoxidation of any of the substrates utilized in the processes of the aforesaid copending application. In addition, the catalysts of the present invention can be utilized in various chelate forms in the manner illustrated by the activity of the chelate forms of the catalysts in the aforesaid copending application. The utility of the present catalysts is further demonstrated by their applicability in the preparation of isoprene as disclosed in the copending application of John R. LeBlanc and myself, Serial Number 696,062, filed of even date herewith.

What is claimed is:

1. A process for introducing oxygen into an organic compound which comprises simultaneously subjecting an organic compound capable of adding oxygen under the influence of light and a photosensitizing catalyst to light irradiation and contact with oxygen and an octaphenylporphyrin, thereby introducing oxygen into the molecule of the said organic compound without destruction thereof, the said octaphenylporphyrin being as represented by the formula:

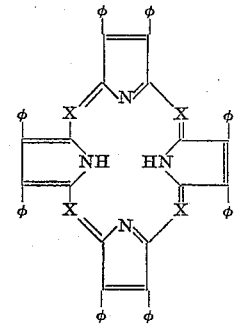

in which φ represents a phenyl group and in which each X is selected from the group consisting of nitrogen and CR, and in which R is selected from the group consisting of hydrogen and alkyl groups having no more than six carbon atoms.

2. The method of claim 1 in which R is hydrogen.

3. The process of claim 1 in which the catalyst is 1,2,3,4,5,6,7,8-octaphenylporphyrazine.

4. The process of claim 1 in which the organic compound is irradiated with light of wave length in the range of about 3600 to 8000 angstroms.

5. The process of claim 4 in which an aliphatic olefin is converted to an aliphatic peroxide.

6. The process of claim 4 in which an aliphatic monoolefin is converted to an aliphatic hydroperoxide.

7. A process of converting propylene trimer to its hydroperoxide which comprises irradiating olefin comprising propylene trimer with light from a source of at least 1000 watts and of wave length of 3600 to 8000 angstroms and contacting the said olefin with oxygen and 1,2,3,4,5,6,7,8-octaphenylporphyrazine, thereby introducing oxygen to form the said hydroperoxide.

References Cited in the file of this patent

UNITED STATES PATENTS

| | | |
|---|---|---|
| 2,165,130 | Coe | July 4, 1939 |
| 2,732,337 | Togel | Jan. 24, 1956 |